(12) United States Patent
Pandit et al.

(10) Patent No.: US 9,758,167 B1
(45) Date of Patent: Sep. 12, 2017

(54) HILL DETECTION AND GRADE PERCENT ESTIMATION LOGIC FOR AN ALL-WHEEL DRIVE SYSTEM

(71) Applicant: GKN Driveline North America, Inc., Auburn Hills, MI (US)

(72) Inventors: Chinmay M. Pandit, Ypsilanti, MI (US); Heather M. Luba, Waterford, MI (US); Bradford A. Withorn, Clarkston, MI (US); Keith E. Ocker, Auburn Hills, MI (US); Douglas J. Priemer, Harrison Township, MI (US)

(73) Assignee: GKN DRIVELINE NORTH AMERICA, INC., Auburn Hills, MI (US)

( * ) Notice: Subject to any disclaimer, the term of this patent is extended or adjusted under 35 U.S.C. 154(b) by 0 days.

(21) Appl. No.: 15/063,546

(22) Filed: Mar. 8, 2016

(51) Int. Cl.
| | |
|---|---|
| *G06F 17/00* | (2006.01) |
| *B60W 30/18* | (2012.01) |
| *B60K 17/348* | (2006.01) |
| *B60W 10/14* | (2012.01) |
| *B60W 30/188* | (2012.01) |
| *B60W 40/076* | (2012.01) |
| *F16H 37/08* | (2006.01) |

(52) U.S. Cl.
CPC ..... *B60W 30/18009* (2013.01); *B60K 17/348* (2013.01); *B60W 10/14* (2013.01); *B60W 30/188* (2013.01); *B60W 40/076* (2013.01); *F16H 37/0806* (2013.01)

(58) Field of Classification Search
None
See application file for complete search history.

(56) References Cited

U.S. PATENT DOCUMENTS

| | | | | |
|---|---|---|---|---|
| 5,033,002 | A * | 7/1991 | Sol | B60T 8/48 180/197 |
| 5,132,906 | A * | 7/1992 | Sol | B60T 8/172 180/197 |
| 5,187,977 | A | 2/1993 | Koschorek et al. | |
| 6,604,595 | B2 * | 8/2003 | Sakakiyama | B60K 17/35 180/233 |
| 6,634,451 | B2 * | 10/2003 | Sakakiyama | B60K 23/0808 180/197 |
| 6,697,725 | B1 * | 2/2004 | Williams | B60K 23/0808 180/249 |
| 6,701,224 | B1 | 3/2004 | Klusemann et al. | |
| 7,653,474 | B2 | 1/2010 | Cawthorne et al. | |

(Continued)

*Primary Examiner* — Dirk Wright
(74) *Attorney, Agent, or Firm* — Jennifer M. Brumbaugh; Reising Ethington P.C.

(57) ABSTRACT

Example methods for distributing torque in a driveline, and driveline systems are disclosed. In one approach, a baseline torque split may be employed, e.g., in a drive unit. The method may further include detecting a first gradient of a first driving surface that exceeds a threshold amount while the driveline is traversing the first gradient using the baseline torque split. The method may further include modifying the second share of torque with respect to the first share of torque in response to the detection of the first gradient. In some examples, a modification may include increasing an amount of torque being distributed to a secondary axle of the vehicle, while in others a torque bias between the primary and secondary axle may be reduced.

21 Claims, 7 Drawing Sheets

(56) References Cited

U.S. PATENT DOCUMENTS

| | | | |
|---|---|---|---|
| 7,974,759 B2* | 7/2011 | Muta | B60K 6/44 |
| | | | 701/69 |
| 8,146,696 B2 | 4/2012 | Kaufman | |
| 8,321,110 B2* | 11/2012 | Post, II | B60K 23/0808 |
| | | | 477/901 |
| 8,706,378 B2 | 4/2014 | Choby | |
| 8,872,645 B2 | 10/2014 | Lee et al. | |
| 9,278,693 B2* | 3/2016 | Perkins | B60T 8/172 |
| 2010/0250056 A1 | 9/2010 | Perkins | |
| 2014/0039772 A1* | 2/2014 | Jensen | B60K 23/0808 |
| | | | 701/69 |
| 2015/0149064 A1 | 5/2015 | Lim et al. | |

* cited by examiner

HILL DETECTION AND GRADE PERCENT ESTIMATION LOGIC FOR AN ALL-WHEEL DRIVE SYSTEM

TECHNICAL FIELD

The present disclosure relates generally to a driveline system for a vehicle.

BACKGROUND

In general, vehicle drivelines transmit torque from a vehicle's engine to its wheels. Automotive drivelines, such as all-wheel drive (AWD) drivelines, commonly employ final drive units (FDUs) for transmitting torque to left and right sideshafts that are located downstream of a vehicle engine and transmission. For example, FDUs may receive driven torque from a propshaft. Final drive units can be mounted at the rear of an automotive driveline or at the front, depending on the architecture of the particular driveline and the location of its engine and transmission. Moreover, an FDU may be provided at both the front and rear, e.g., where one drives the front wheels and the other drives the rear wheels in an AWD driveline. FDUs typically include differential gearsets that allow wheels on one sideshaft to spin faster or slower than wheels on the other sideshaft.

Vehicle drivelines may be capable of controlling and varying a torque apportionment between axles or other output shafts of a driveline. Merely as one example, a transfer case or Power Take Off (PTO) unit may apportion torque between front and rear axles of a vehicle. In some known approaches, a driveline may reduce a wheel or axle's share of engine torque when slip is detected at that wheel/axle.

Torque management of the vehicle that is appropriate for one set of operating conditions may harm performance in other conditions. Thus, since vehicles may not be capable of robustly detecting all of the different operating conditions influencing vehicle performance, vehicle manufacturers typically must accept performance compromises. For example, hill or grade climbing abilities of a vehicle may be enhanced by increasing an amount of torque sent to a secondary drive axle while traversing the hill. However, the same reaction during a sharp turn on a slippery or low-friction surface (e.g., snow, ice, gravel, etc.) could reduce vehicle stability and could therefore be undesirable. Thus, vehicle manufacturers sometimes sacrifice the ability to maximize hill climbing capabilities in the name of more stable driveline behavior on low-friction surfaces. Moreover, available methods for determining when a vehicle is traversing a graded surface may not accurately determine the presence of a grade and/or the magnitude thereof.

SUMMARY

In at least some implementations, a method may include determining a baseline torque split, wherein a first share of torque is distributed to a primary axle of a vehicle driveline, and a second share of the torque is distributed to a secondary axle of the vehicle driveline. The method may further include detecting a first gradient of a first driving surface while the driveline is traversing the first gradient using the baseline torque split, with the first gradient having a positive grade exceeding a threshold amount. The method may further include modifying the second share of torque with respect to the first share of torque in response to the detection of the first gradient. As described further below, in some examples a modification may include increasing an amount of torque being distributed to a secondary axle of the vehicle, while in others a torque bias between the primary and secondary axle may be reduced.

An example driveline may include a drive unit configured to divide torque between a primary axle and a secondary axle of a vehicle. The drive unit may be configured to employ a baseline torque split with a first share of the torque being distributed to the primary axle of the vehicle driveline, and a second share of the torque being distributed to the secondary axle of the vehicle driveline. The drive unit may be configured to detect a first gradient of a first driving surface while the driveline system is traversing the first gradient using the baseline torque split, and modify the second share of torque with respect to the first share of torque in response to a detection of wheel slippage while traversing the first gradient.

BRIEF DESCRIPTION OF THE DRAWINGS

The following detailed description of exemplary embodiments and best mode will be set forth with reference to the accompanying drawings, in which.

DETAILED DESCRIPTION

Figure 1:
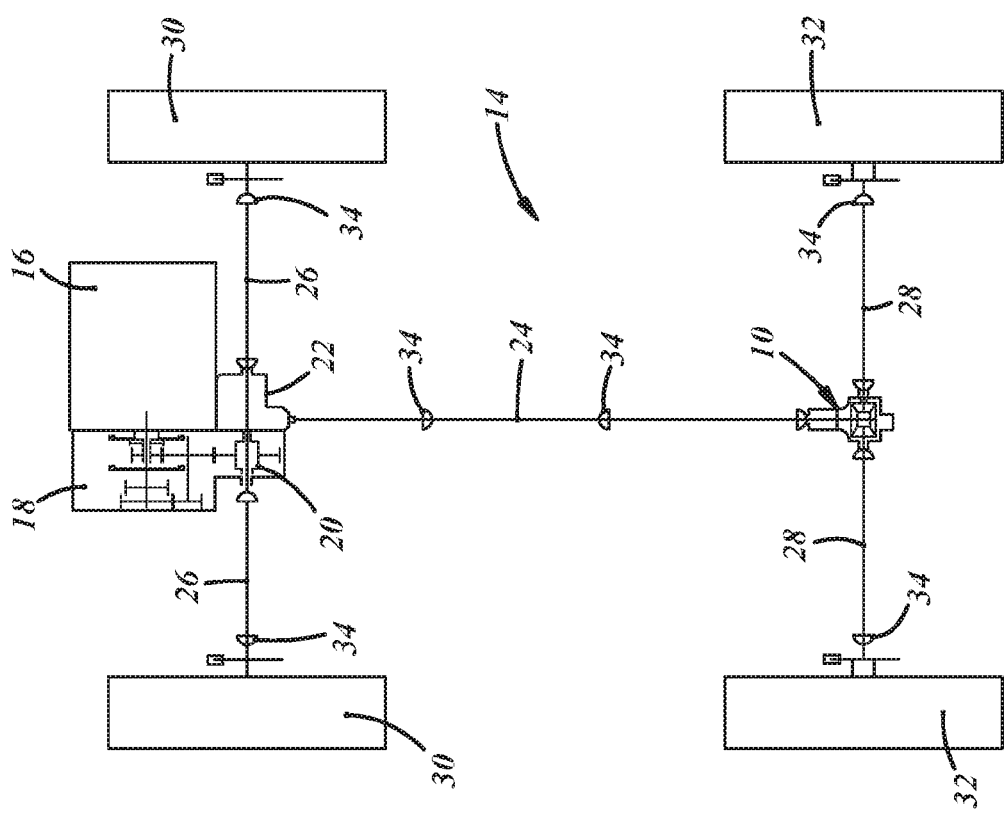
FIG. 1 is an illustration of an example driveline for a vehicle.

Referring in more detail to the drawings, FIG. 1 illustrates an example architecture of a driveline 14 for an automobile. In the illustration shown, the driveline 14 is an all-wheel drive (AWD) where each of four wheels 30, 32 are driven. Alternatively, in other approaches less than all of the wheels 30, 32 may be driven at any given time, such as in a part-time four-wheel-drive system. The example illustrations are applicable to any vehicle where at least two axles share a distribution of torque from an engine, where the torque distribution may be modified during vehicle operation.

The driveline 14 receives torque input from an engine 16 and a transmission 18, and includes a front differential 20, a power transfer unit (PTU) 22, a propshaft 24, a differential or final drive unit 10, front sideshafts 26, and rear sideshafts 28. The differential 10 and/or final drive unit may be configured as an open, limited slip, or locking differential. A first axle of the vehicle includes the front sideshafts 26, each of which respectively spin one of the front wheels 30. A second axle of the vehicle includes the rear sideshafts 28, each of which respectively spin one of the rear wheels 32.

In the example here, various joints 34 are located at the propshaft 24 and at the sideshafts 26, 28. The joints 34 could be constant velocity joints (CVJs), universal joints, tripod joints, cardan joints, or another kind of joint. The PTU 22, also known as a power take-off unit, is a multi-piece mechanism with gears, shafts, and other components that work together to transmit torque to the propshaft 24. The PTU 22 may be a disconnecting type, where it is selectively removable from rotational communication with other driveline components. The disconnected driveline components are no longer driven to transmit torque between them, and driven torque is hence precluded from regions of the accompanying driveline not needing torque under particular conditions. In other examples, the PTU 22 may be a non-disconnecting PTU, i.e., the PTU is in constant rotational communication with the driveline such that it is either being actively driven or passively rotating at all times the vehicle is in motion. Together, the driveline components transmit torque from the engine 16 to the wheels 30, 32. Still, the driveline 14 could have other architectures in other examples and might include more, less, and/or different components than those depicted in FIG. 1 and described here, and the components can be arranged in different ways. Indeed, the exact architecture and its components are often dictated by the particular vehicle platform and set by the manufacturer.

As will be described further below, at least one of the engine 16, transmission 18, PTU 22, or final drive unit 10 may have an electronic control unit (ECU) or other type of controller included. The ECU/controller may facilitate responses of the driveline 14 to changes in operating conditions of the vehicle.

The driveline 14 may be configured to distribute torque output by the engine 16 to the four wheels 30, 32. For example, one or both of the PTU 22 and/or FDU 10 may be configured to apportion torque between the axles associated with the wheels 30, 32 and modify a torque split in response to changes in vehicle and/or driving conditions. For example, apportioning a larger share of engine torque to a wheel or wheels having greater traction than another wheel experiencing slip may enhance performance of the driveline 14 during certain driving conditions.

The PTU 22 may divide torque between the first and second axles, and may alter this torque split between the front wheels 30 and rear wheels 32 in response to vehicle and/or driving conditions, as noted above. Accordingly, wheels having the greatest traction may receive a greater share of torque from the engine 16. During normal operating conditions, the torque split may be biased such that one pair of wheels receives a greater share of the torque than the other pair. For example, the PTU 22 may apportion torque imparted by the engine 16 between the front and rear wheels 30, 32 in such a manner that the front wheels 30 receive a greater share of the torque output by the engine 16 than the rear wheels 32, or vice versa. In this manner, the first axle—and the included shafts associated with the pair of wheels receiving the greater share of torque, e.g., the sideshafts 26 which drive the front wheels 30—may be thought of as a primary axle of the driveline 14. The second axle and included shaft(s) driving the pair of wheels receiving a lower share of torque, e.g., sideshafts 28 which drive the rear wheels 32, may in turn be thought of as a secondary axle of the driveline 14. In other examples, the rear sideshafts 28 may receive a greater share of the engine torque (and thus be the "primary" axle), while the front sideshafts 26 are the secondary axles receiving a lesser share of the engine torque. In still other approaches, a torque split may be generally equal between wheels or axles.

Regardless of whether or which axle receives a greater share of torque during normal operating conditions, a division of torque may be altered according to road, vehicle, or other conditions. For example, as described further below, in one example approach the driveline 14 may use a baseline torque split between the first and second axles, and a different torque split while traversing a gradient exceeding a threshold amount. A threshold amount, below which the driveline does not alter a torque split, may be used to prevent the driveline from shifting between different torque splits when the vehicle is positioned on or traversing a relatively small hill or grade. Merely by way of example, a threshold amount may be a 1% grade, and could be other percentages of grade. Alternatively, the driveline 14 may detect the presence of any grade and respond accordingly by adjusting a torque split. The torque split and control thereof may be implemented by a mechanical device(s), by the ECU, or by another type of controller associated with the driveline 14 or vehicle into which the driveline 14 is installed. In some example approaches, a vehicle may be equipped with sensors configured to detect the possibility of or actual wheel slippage, e.g., by detecting changes in wheel acceleration, wheel speed, vehicle acceleration, vehicle speed, vehicle attitude such as yaw or pitch, etc. The sensors may be in communication with an electronic control unit of the driveline 14 or vehicle, allowing the electronic control unit to alter a torque split, e.g., between the front and rear wheels 30, 32, accordingly.

The driveline 14 may also be configured to discriminate between conditions where a shift in the torque split may be desired, e.g., while traversing a hill, and other situations where a change to the torque split may not be desired, such as while on a level, relatively low-friction surface, e.g., ice, snow, gravel, or the like. For example, the driveline 14 may be equipped with sensors to detect wheel speed, acceleration, vehicle speed, or any other parameters that may be convenient.

In some example approaches, the driveline 14 may be configured to mitigate, or eliminate entirely, interventions or changes in a torque split between a primary and secondary axle. For example, at low speeds any change to the torque split may increase driveline noise or oscillation of driveline components as a result of stresses or interactions between mechanical components of the driveline, e.g., the propshaft or sideshafts, as a result of the change in torque loads distributed through the components. Accordingly, during normal operation, such as while on generally level ground and at lower speeds where such driveline noise or oscillations may be more perceptible to vehicle occupants, the driveline 14 may deactivate or reduce interventions such as changes to a torque split between primary and secondary axles. On the other hand, when the driveline 14 determines that the vehicle is traversing a driving surface having a non-zero grade that is greater than a threshold amount, reducing driveline noise and/or oscillations may be less of a priority, since driveline noise/oscillations may be less perceptible to vehicle occupants and improving the vehicle's ability to climb the hill may be more of a priority. As such, when the driveline 14 detects the presence of a grade in the driving surface or a grade that exceeds some non-zero threshold magnitude, there may be less of a need to reduce interventions or shifts in a torque split. In some example approaches, therefore, a modification of a torque split between primary and secondary axles while traversing a gradient may take the form of re-activating or reducing an extent to which the driveline 14 would otherwise decrease a magnitude of a shift in the torque split were the vehicle on more level ground.

In some examples, the driveline 14 may accomplish modifications in a torque split by increasing torque to one of the axles, e.g., the secondary axle. For example, the driveline 14 may employ an offroad torque split strategy where secondary axle torque is relatively increased with respect to the primary axle torque, particularly at low speeds typical of offroad maneuvers. In another example, a torque split may be modified by switching a steering bias of the driveline 14 to an offroad mode. More specifically, a steering bias of the driveline 14 may be altered by providing significantly higher torque to the secondary axle(s), even at relatively high steer angle inputs.

In some example approaches employing independently controlled clutch packs, a separate torque command lookup table may be used for torque commands when a graded surface has been detected. More specifically, a calibration or lookup table according to a first approach may be used when the driveline 14 is on level ground. In this first approach, as vehicle steering input is increased the torque at the secondary axle is modified to keep the vehicle stable. In a second approach used on a graded surface, i.e., when the driveline 14 detects the presence of a grade, a different set of tables can be used to allow an even torque distribution with changes in steering input to improve the gradability of the vehicle. The resulting additional torque to the secondary axle may reduce a bias between the primary and secondary axles.

In still other example approaches, a torque split may be modified by reducing an effective steering wheel angle input. In other words, a slip torque distributed to an inside wheel of the secondary axle at high steering wheel angles may be increased, thereby reducing a bias between the primary and secondary axles of the driveline 14.

In some example approaches, a greater magnitude grade may result in more significant increases in torque to a secondary axle or more significant shifts in a torque split, further reducing torque biasing between the primary and secondary axles. Accordingly, a response of the driveline 14 to a certain grade may be in proportion to the magnitude of the grade, such that the driveline 14 responds more aggressively to greater magnitude grades.

In general, computing systems and/or devices, such as the electronic control unit or controller associated with the driveline 14 and/or the vehicle, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor), as may be included in the electronic control unit discussed above, receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of an electronic control unit or computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, e.g., as may be incorporated into the electronic control unit, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and may be accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., electronic control units, servers, personal computers, etc.), stored on computer readable media associated therewith (e.g., disks, memories, etc.). A computer program product may comprise such instructions stored on computer readable media for carrying out the functions described herein.

Figure 2:
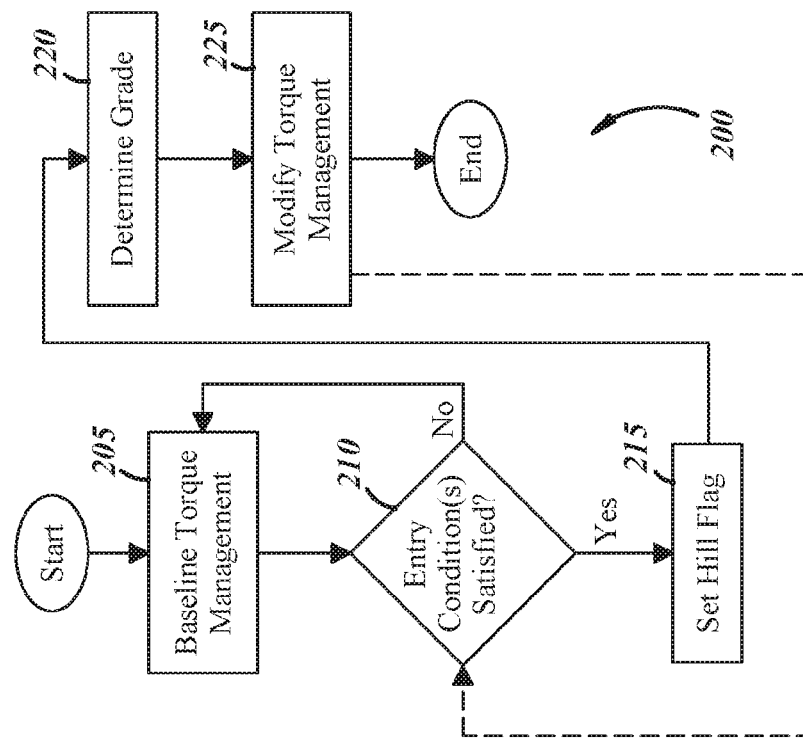
FIG. 2 is a process flow diagram for a method of managing driveline torque, according to one example approach.

Turning now to FIG. 2, an example process 200 of managing a driveline torque distribution is described in further detail. Process 200 may begin at block 205, where a baseline torque management or split is established. For example, one pair of wheels, e.g., front wheels 30, may receive a larger share of torque from an engine 16 than the other pair of wheels, e.g., rear wheels 32. The torque split may be biased toward the front wheels 30, such that the associated sideshafts 26 are the primary axle of the driveline 14, while the sideshafts 28 of the rear wheels 32 are the secondary axle. A bias between the front and rear wheels 30, 32 may provide a desired driving dynamic of the driveline 14 and/or the vehicle. Alternatively, torque may be divided between wheels or axles generally equally. The baseline torque split may be established and used during most normal operating conditions, e.g., on level, smooth, and/or relatively high-friction surfaces. Process 200 may then proceed to block 210.

At block 210, process 200 may query whether one or more entry conditions have been satisfied, thereby justifying whether the driveline 14 should calculate a grade and/or modify the baseline torque split. As noted above, it may be desirable to calculate a magnitude of a grade being traversed by the driveline 14 during only a subset of all driving conditions. In one example approach, the entry condition(s) are selected in order to determine with increased confidence whether the driveline 14 is traversing a gradient. Accordingly, one or more entry conditions may be selected based upon a likelihood that the driveline 14 would benefit from calculating a magnitude of the grade and adjusting operating parameters of the driveline 14, e.g., a torque split between primary and secondary axles. Moreover, using a plurality of different entry conditions may allow more robust performance by screening out conditions where adjustment of a baseline torque split, e.g., on level ground, would not be desirable.

One example entry condition may be a validity of vehicle inertial signals. More specifically, where an inertia of the vehicle is calculated by a plurality of sensors, e.g., accelerometers positioned at a plurality of wheels and/or on the vehicle, the inertial signal validity entry condition may only be satisfied where there is a high degree of confidence that the inertial signal(s) are being determined accurately. For example, if one sensor suddenly loses its signal or there are significant fluctuations in the signal, process 200 may determine that the inertial validity entry condition is not satisfied, since this may be an indication that the sensor will not be capable of accurately measuring a magnitude of a graded surface or even whether the driveline 14 is on a graded surface to begin with.

Another example entry condition may be a minimum value for a slowest wheel acceleration. In other words, this entry condition may be satisfied only where the lowest acceleration value amongst the vehicle wheels does not exceed a predetermined minimum amount. Example minimum amounts may be gravitational acceleration (approximately 9.81 m/s$^2$), a measured vehicle longitudinal acceleration, or the lower of the two amounts. This entry condition may be particularly useful since it may generally be undesirable to make changes in a torque split of the driveline 14 when the acceleration values of each of the wheels are relatively large, thereby indicating that the driveline 14 is already commanding significant torque values to the primary and secondary axles. In such cases, increasing secondary axle torque or reducing a bias in favor of a primary axle may be less beneficial.

Another example entry condition may be a difference between the lowest acceleration value of the vehicle wheels and the vehicle acceleration. Where the vehicle acceleration is significantly different from the minimum acceleration value amongst the vehicle wheels, e.g., indicating that the vehicle acceleration value is significantly less than the minimum wheel acceleration value, it may not be desirable to attempt any modifications to the vehicle torque split as this may indicate that the wheel(s) are already receiving more than sufficient torque.

Vehicle rolling state may also be used as an example entry condition. More specifically, where one or more vehicle wheels are slipping, or where all of the vehicle wheels are slipping, it may be less desirable to initiate changes to a torque split or increased torque to the secondary axle, since a torque sufficient to initiate slip at the wheel(s) has already been commanded by the driveline 14.

A threshold vehicle speed may also be used as an entry condition, alternatively or in addition to other entry conditions mentioned above. For example, this entry condition may only be satisfied where vehicle speed is below a predetermined threshold amount, as it may generally be undesirable to initiate changes to a torque split between primary and secondary axles of the vehicle when the vehicle has already achieved speed on the driving surface.

Other example entry conditions may include a change in vehicle yaw ("delta yaw"), anti-lock braking system activity, and stability control system activity. Each of these entry conditions may be satisfied, for example, where they provide an indication that the vehicle is operating normally. More specifically, these entry conditions may be satisfied when a rate of change in a vehicle yaw signal does not exceed a predetermined amount (thereby indicating the vehicle is not in oversteering, understeering, in a spin, etc.), when there is no current activity and/or recent activity of the anti-lock braking system, and when there is no current activity and/or recent activity of the stability control system.

In one example approach, process 200 proceeds back to block 205 where any one of the entry conditions has not been satisfied. In other approaches, process 200 may require that more than one of the entry conditions not be satisfied in order to bring process 200 back to block 205. Generally, movement back to block 205 may be executed at any time there is doubt regarding the ability of the driveline 14 to accurately determine a magnitude of a graded surface being traversed by the driveline 14, particularly when the driveline 14 is in motion along the graded surface. Accordingly, process 200 may continue using the baseline torque management scheme established at block 205.

Alternatively, where each of the entry conditions are satisfied or otherwise collectively indicate that a magnitude of a grade being traversed by the driveline 14 can be accurately determined, process 200 may proceed to block 215. At block 215, a hill flag may be set, e.g., in an electronic control unit of the driveline 14 and/or the vehicle. The hill flag may provide an indication that the driveline 14 is operating at low speeds and in a controlled manner, such that the driveline 14 may benefit from interventions or modifications to a torque split upon detection of a grade. In some examples, a torque split different from the baseline torque split may be employed as a response, as will be described further below. Process 200 may then proceed to block 220.

At block 220, the driveline 14 may calculate or determine a grade of the present driving surface. As further described below, the calculated grade may be used to initiate modifications to a torque split of the driveline 14, e.g., a shift away from the baseline torque split initiated at block 205. Grade may be determined in any manner that is convenient. In one example illustration, a difference between a measured or actual longitudinal acceleration of the vehicle and a calculated acceleration of the vehicle (e.g., as calculated from the rate of change in the measured vehicle wheel speed(s)) may initially be determined, which provides an estimate of a grade along the longitudinal axis of the vehicle. Similarly, a difference between a measured/actual lateral acceleration of the vehicle and the lateral acceleration as estimated/calculated from a measured yaw rate of the vehicle may provide a measurement of a banking, i.e., a grade along the lateral axis of the vehicle. Each of the longitudinal and lateral grade may be used to determine actual grade of the driving surface using the trigonometric relationship between the estimated longitudinal and lateral grades.

Proceeding to block 225, the driveline 14 and/or the vehicle may alter a torque management scheme, e.g., by changing a torque split between primary and secondary axles of the driveline 14. In one example illustration, the driveline 14 may increase a distribution of torque to one axle, e.g., the secondary axle. In another example, the driveline 14 may decrease a bias between two axles, e.g., the primary and secondary axles of the driveline 14. In still another example approach, the driveline 14 may decrease a share of the torque being distributed to one axle, e.g., the primary axle.

Improved hill/graded surface performance may be realized in several ways by the driveline 14. For example, the increase in torque to a secondary axle may improve grade climbing performance by increasing the amount of torque distributed to wheels likely to provide the best grip when traversing a grade. More specifically, where the secondary axle of the vehicle is a rear axle of the vehicle, a greater share of an overall weight of the vehicle and/or driveline may be supported by the rear wheels and secondary axle. Accordingly, the rear wheels may be less likely to experience slip, and may be better able to put engine power to the ground via the rear wheels 32. Additionally, a reduction in bias between primary and secondary axles of the driveline 14 may reduce the dependence of the driveline 14 upon the primary axle. In other words, by spreading torque more evenly to each of the primary and secondary axles, the likelihood of wheel slip at the primary axle may be reduced.

Figure 3A:
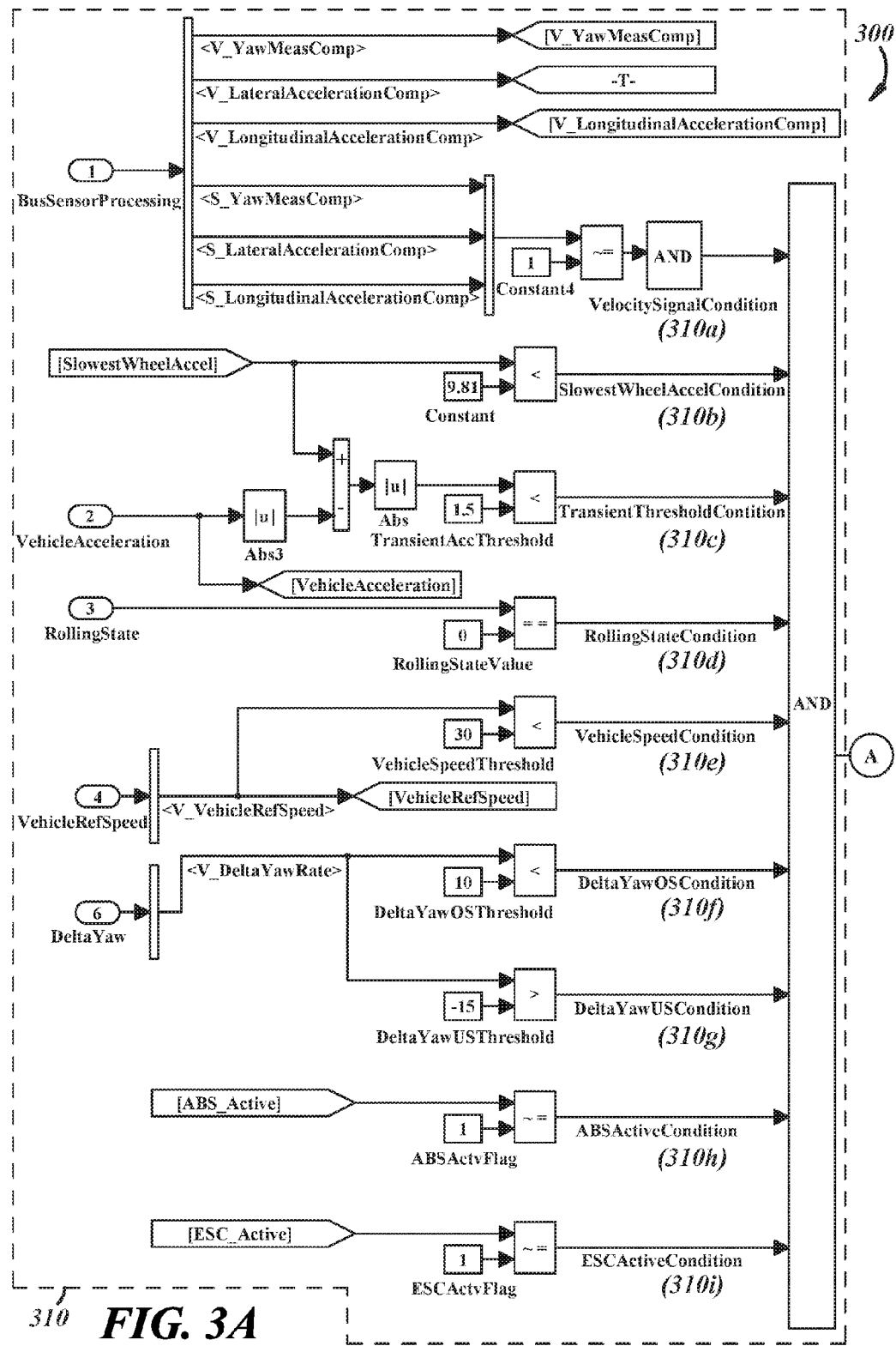
FIGS. 3A and 3B illustrate a control diagram for a method of managing driveline torque, according to one example approach.
Figure 3B:
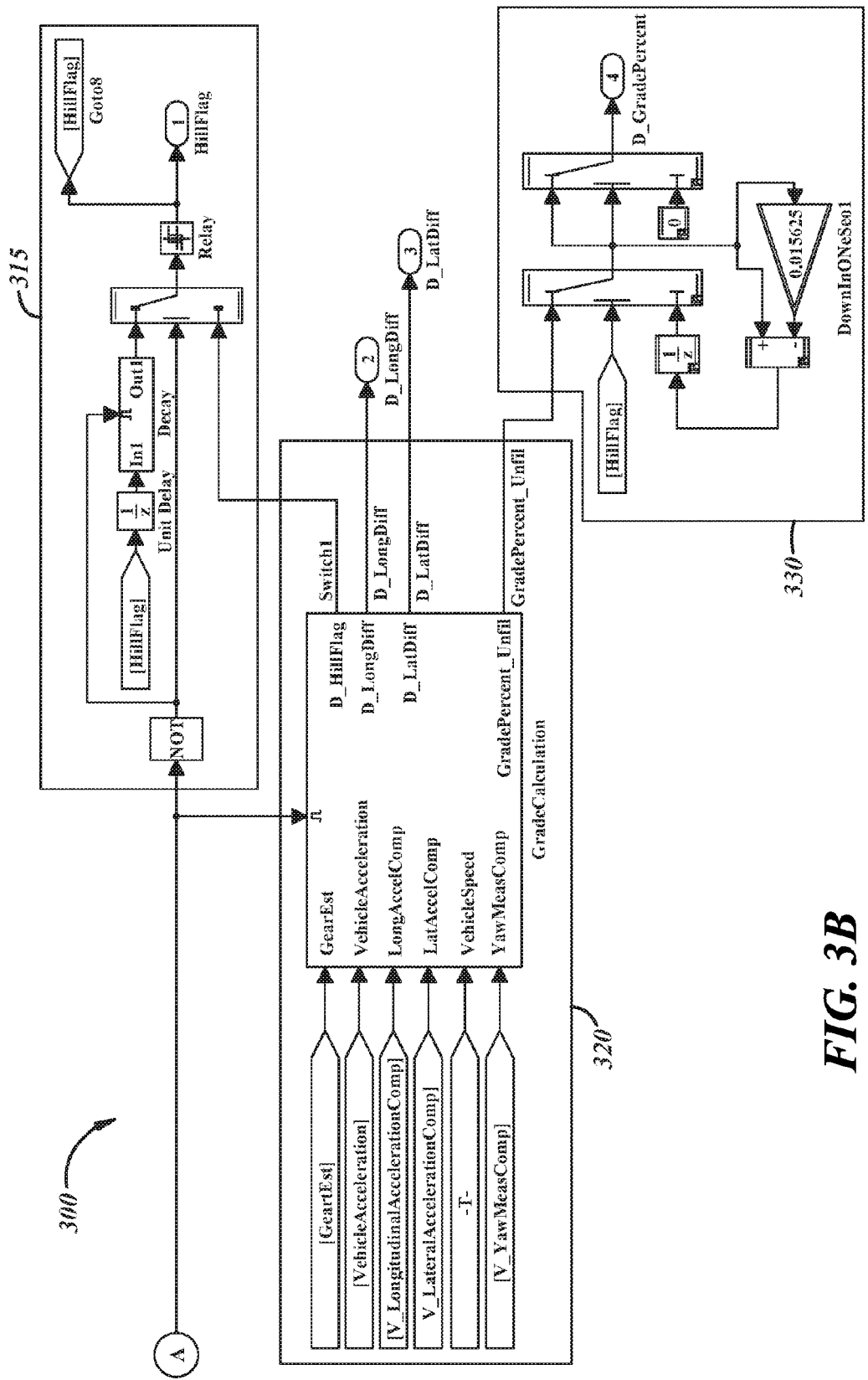

Turning now to FIGS. 3A and 3B, an example control process 300 is illustrated, as a more detailed example of the process 200 described above.

More specifically, at block 310, a plurality of entry conditions are specified. The entry conditions 310a, 310b, 310c, 310d, 310e, 310f, 310g, 310h, and 310i may be determined in order to ensure that vehicle sensors are capable of properly determining the grade being traversed by the vehicle. For example, the nine entry conditions described above in block 210 of process 200 may be used.

More specifically, entry condition 310a ("velocity signal condition") includes a representation of the validity of vehicle inertial signals, e.g., as described above regarding block 210. As noted above, where an inertia of the vehicle is calculated by a plurality of sensors, e.g., accelerometers positioned at a plurality of wheels and/or on the vehicle, the inertial signal validity entry condition may be satisfied where there is an increased degree of confidence that the inertial signal(s) are being determined accurately. In the example entry condition 310a, the measured vehicle yaw rate may be compared with the expected yaw rate based upon the measured lateral and longitudinal vehicle acceleration at two different points on the vehicle, e.g., two wheels. Where the expected yaw rate is equal to or within a minimum range of the actual rate, this may indicate that vehicle inertial signals are valid and can be trusted.

Entry condition 310b ("slowest wheel acceleration condition") determines whether the slowest wheel acceleration exceeds a minimum value. As described above, this entry condition may be satisfied where the lowest acceleration value amongst the vehicle wheels does not exceed a predetermined minimum amount. In this example, the slowest wheel acceleration is compared with gravitational acceleration (approximately 9.81 m/s$^2$), and thus may be satisfied if the slowest wheel acceleration does not exceed that of gravity.

Entry condition 310c ("transient threshold condition") is a difference between the lowest acceleration value of the vehicle wheels and the vehicle acceleration. As noted above, this condition may be determined by comparing the vehicle acceleration with the minimum acceleration value amongst the vehicle wheels. Where the vehicle acceleration value is significantly less than the minimum wheel acceleration value, it may not be desirable to attempt any modifications to the vehicle torque split as this may indicate that the wheel(s) are already receiving more than sufficient torque.

Entry condition 310d ("rolling state condition") relates to the vehicle rolling state, i.e., whether the wheel(s) of the driveline 14 are slipping. Where one or more vehicle wheels are slipping, or where all of the vehicle wheels are slipping, it may be less desirable to initiate changes to a torque split or increased torque to the secondary axle, since a torque sufficient to initiate slip at the wheel(s) has already been commanded by the driveline 14.

Entry condition 310e ("vehicle speed condition"), as noted above, may be satisfied where vehicle speed is below a predetermined threshold amount. In the example illustrated in FIG. 3A, the threshold amount may be, merely as one example, 30 miles per hour (mph). Generally, it may be undesirable to initiate changes to a torque split between primary and secondary axles of the vehicle when the vehicle has already achieved speed on the driving surface.

Entry conditions 310f and 310g (the "delta yaw conditions," shown as separate "DeltaYawOSCondition," which relates to a change in yaw due to oversteer, and "DeltaYawUSCondition," which relates to a change in yaw due to understeer) each relate to a change in vehicle yaw. For example, where the vehicle yaw does not exceed a threshold minimum value, this may indicate that the vehicle is not oversteering, understeering, in a spin. Accordingly, the entry condition 310f (and/or 310g) may be satisfied where the delta yaw is below the threshold amount, indicating that the vehicle is in a relatively steady steering/operating state where the grade calculation may be more trustworthy.

Entry conditions 310h and 310i relate to anti-lock braking system activity and stability control system activity, respectively. As noted above, each of these entry conditions may be satisfied where they provide an indication that the vehicle is operating normally. In other words, entry condition 310h may be satisfied when there is no current activity and/or recent activity of the anti-lock braking system. Similarly, entry condition 310i may be satisfied when there is no current activity and/or recent activity of the stability control system.

At block 315, a hill flag may be initiated upon satisfaction of the entry conditions in block 310. Moreover, if any one of the entry conditions expire, the hill flag may be decayed to zero, thereby allowing the control process to avoid sudden shifts in behavior. In other words, if one or more entry conditions expire while the driveline 14 is in a state where a modified torque split is being used, the system may generally "decay" back to using the baseline or initial torque split. In this manner, a switch back to the baseline or initial torque split is delayed for a desired period of time. The time over which any decay occurs may be adjustable from increments as small as a fraction of a second to a few seconds, or even longer.

Proceeding to block 320, a magnitude of the grade upon which the vehicle is traveling may be determined. This calculation may be undertaken while the vehicle is traversing the grade. By contrast, in previous approaches grade calculation during vehicle travel was unreliable due to the lack of confidence in grade calculations during transient maneuvers, e.g., during slip conditions. However, in the example illustrations provided herein, the use of entry conditions as a check before permitting calculation of the grade magnitude prevents the driveline 14 from attempting to calculate the grade when it is unlikely that such transient determinations will be accurate. Moreover, the use of the entry conditions also prevent the driveline 14 from initiating shifts in a torque split when it is uncertain whether such shifts may be beneficial to the vehicle.

Proceeding to block 330, the grade magnitude output from block 320 may be decayed upon expiration of the hill flag to zero at block 315. This decay results in a delay, e.g., a fraction of a second or even a few seconds, from when the grade magnitude calculation is no longer needed to when the calculation is deactivated.

Turning now to FIGS. 4A, 4B, 5A, and 5B, performance of an example driveline system is described in relation to two example test scenarios. The first test scenario is a 20% graded hill climb up a low-friction surface, while the second test scenario is a low-friction level ground test. The two scenarios illustrate the compromise that, under previous approaches, is often struck between level surface and graded surface performance. As will be described further below, the example illustrations allow for improved performance on both test scenarios, as the entry conditions and grade calculation methodologies facilitate the use of different torque splits customized for each test scenario.

More specifically, the first test scenario (illustrated in FIGS. 4A and 4B and described further below) involves an approach to the graded surface at 45 degrees (i.e., in-between a perpendicular approach to the grade, and a path where the vehicle travels parallel to the grade). The vehicle approaches the grade, traveling uphill along the grade. The driving surface is wetted to simulate a relatively low-friction surface, e.g., a driving surface covered with snow. In one example, the simulated low-friction surface has a tire-surface coefficient (a combination of static and dynamic friction at the tire-surface interface) of friction of approximately 0.3-0.35. The vehicle begins from a stopped position, and is steered directly into the hill in an attempt to travel up the grade. The test generally measures the ability of the vehicle to traverse graded surfaces in low-friction conditions, e.g., rain, ice, snow, gravel, or the like.

The second test scenario (illustrated in FIGS. 5A and 5B and described further below) involves a relatively sharp turn at low speed on level ground with a similarly low coefficient of friction. More specifically, the vehicle begins from a stop, and proceeds with a large steering input (in this case a 360 degree rotation of the steering wheel) at constant throttle. The second test scenario seeks to test the ability of the vehicle to maintain stability and resist a spinout while turning on the low-friction surface.

Figure 4A:
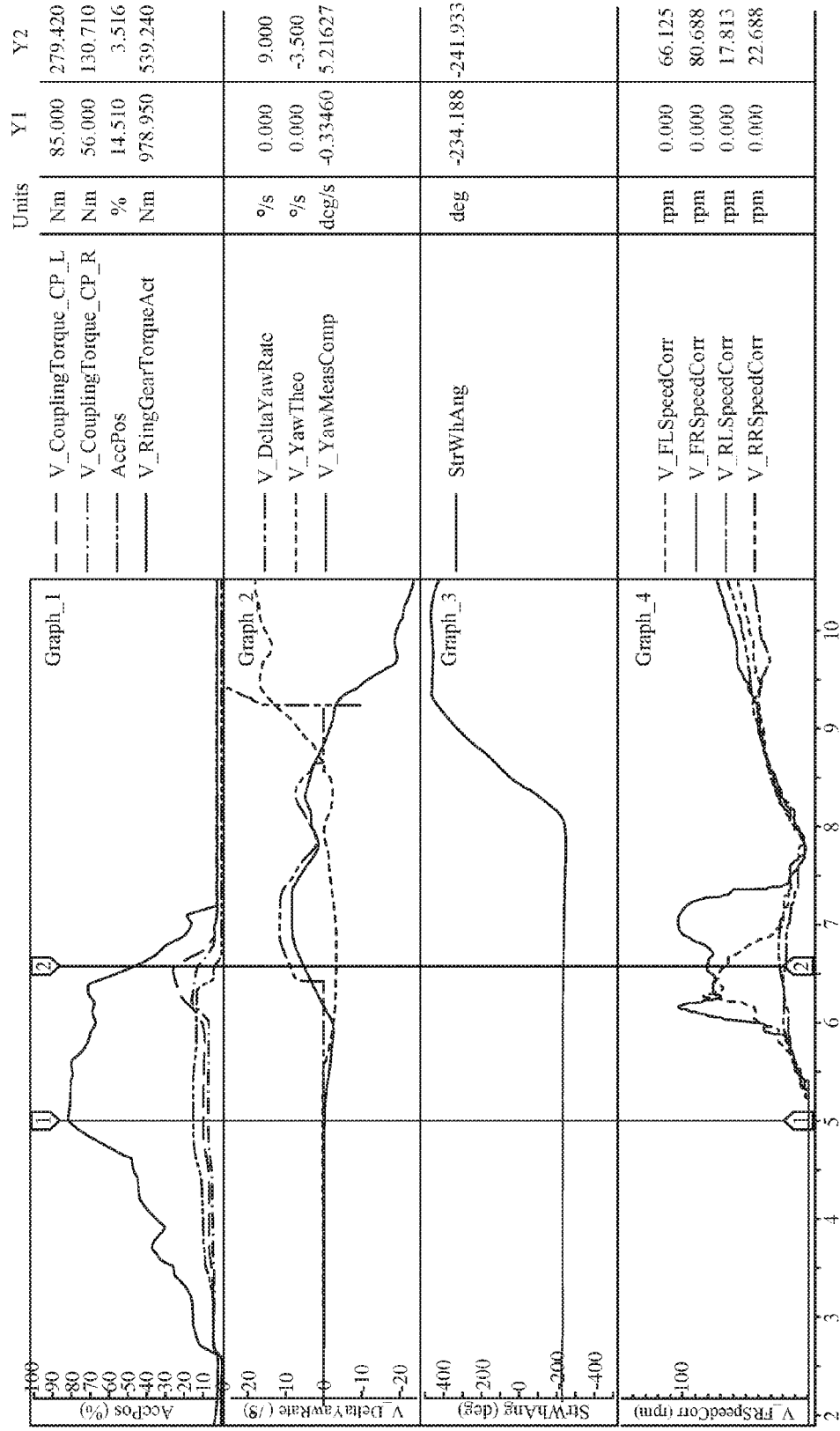
FIG. 4A illustrates a test result for a vehicle driveline attempting to traverse a standardized hill test, using a known methodology.

Referring now to FIG. 4A, a test result on the first/hill test scenario using a driveline torque management scheme typical of previous approaches is illustrated. In this example, the vehicle driveline does not significantly modify a torque split of the driveline 14. As a result, as the vehicle begins ascending the hill at time Y1, torque command or request for the secondary axle remains significantly less than that of the primary axle (shown as being 85 N-m and 56 N-m at the left and right clutches of the secondary axle, compared with over 978 N-m at the ring gear of the primary axle). It should be noted that the commanded torque request signals are not equivalent to the measured/actual torque being provided by the driveline 14, but rather reflect the torque that is desired/commanded. While requested/commanded torque can exceed the actual/measured torque, the measured torque at all four wheels generally will not exceed the ring gear torque.

Moreover, even as the vehicle begins the attempt to climb the grade and some additional torque is commanded to the secondary axle as a result of the throttle command by the driver, maximum torque at the secondary axle (at time Y2) is still less than 280 N-m. As a result of the relatively low amount of torque initially sent to the secondary axle, the front wheels begin to slip, resulting in slip torque being requested, i.e., additional torque is requested at the secondary axle. The vehicle starts rotating back downhill, and the driver is forced to switch the driveline to neutral and turn the steering to the left in attempting to regain stability. Moreover, the vehicle fails to climb the grade, as shown by the differing wheel speeds measured at time Y2 in Graph 4 (which indicate the vehicle sliding back down the hill).

Figure 4B:
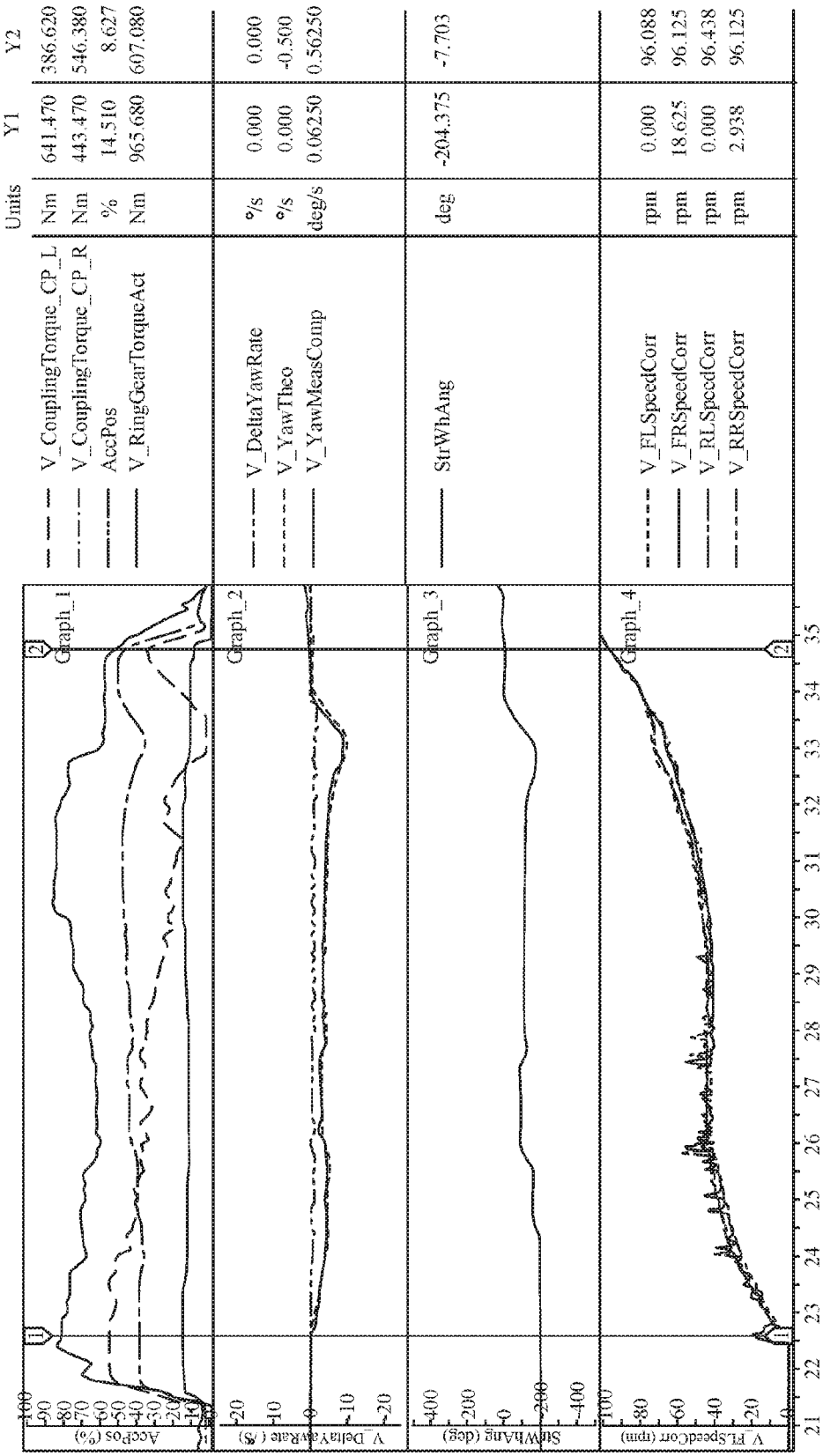
FIG. 4B illustrates a test result for a vehicle driveline employing a methodology according to an example illustration, when attempting to traverse the same standardized hill test illustrated in FIG. 4A.

Turning now to FIG. 4B, the test result in the first test scenario is illustrated for a vehicle with a driveline configured in a manner consistent with the example illustrations, i.e., where torque requests to the secondary axle are increased in response to the detection of a graded surface. In comparison to the attempt by the vehicle in FIG. 4A, here the vehicle sees peak torques at each of the wheels of the secondary/rear axle of 641 N-m and 443 N-m. As a result of the increased torque early in the climb, the driver is able to maintain a straight path and constant throttle, and the vehicle is able to climb the grade and accelerate.

Figure 5A:
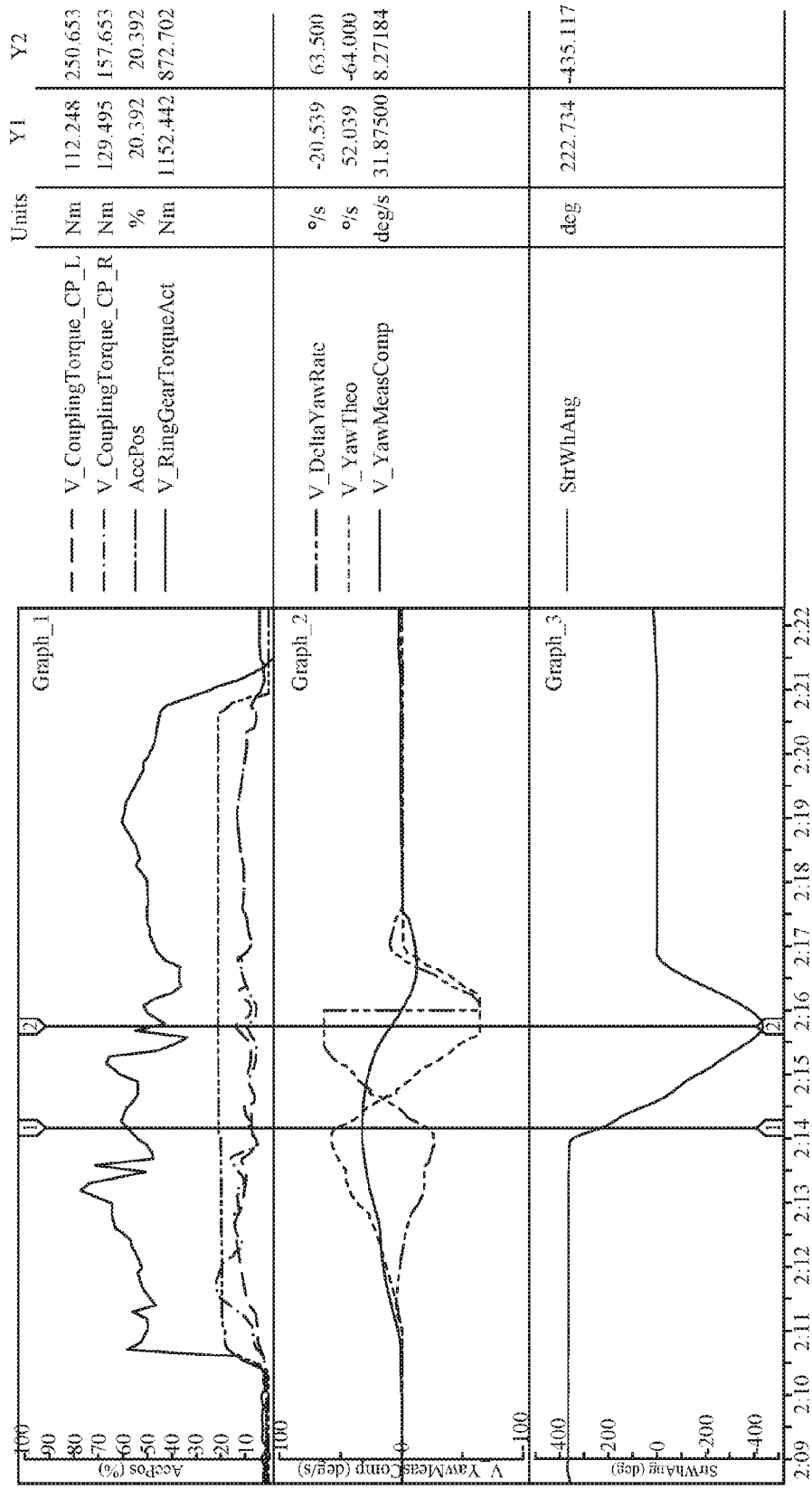
FIG. 5A illustrates a test result for a vehicle driveline attempting to traverse a standardized low-friction level ground test, using a known methodology.
Figure 5B:
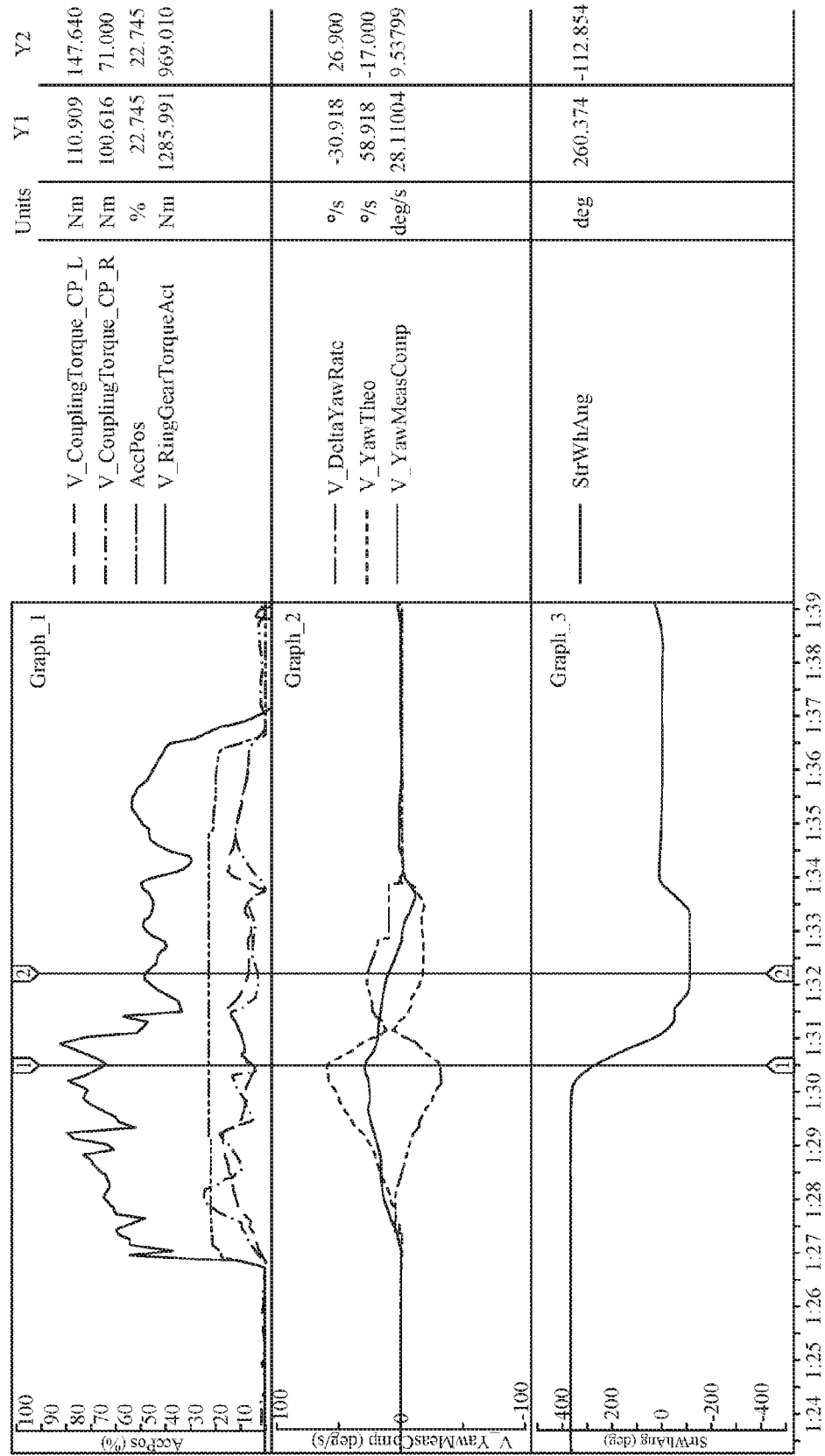
FIG. 5B illustrates a test result for a vehicle driveline employing a methodology according to an example illustration, when attempting to traverse the same standardized low-friction level ground test illustrated in FIG. 5A.

Turning now to FIGS. 5A and 5B, performance of the drivelines using a previously known approach and example approach are shown, respectively, in the level ground/low-friction surface test scenario. While vehicles in both configurations are able to complete the maneuver, the configuration illustrated in FIG. 5B has increased stability compared with the previous approach as demonstrated by the slightly lower torque commanded at the secondary axle during the test. As such, this demonstrates how the example approach is able to further reduce torque commands at the secondary axle during low-speed, low-friction maneuvers. More specifically, the vehicle using the example approach need not necessarily compromise between performance on level ground and on graded surfaces, and thus may further reduce an extent to which torque at the secondary axle is changed upon detection of wheel slip.

Accordingly, a vehicle driveline using a torque management approach consistent with the example illustrations provided above need not necessarily compromise between level ground and graded surface performance in low-friction conditions. For example, a grade detection module allows the driveline to be calibrated for additional levels of torque to the secondary axle on a gradient, while also reducing the torque commanded to the secondary axle on level ground. Accordingly, the driveline 14 may be more appropriately tailored for performance on both graded and level surfaces. As additional benefits, grade detection may be improved on rough surfaces, e.g., on gravel hills, using a program for determining the presence of a rough or uneven surface, e.g., using an anti-lock braking, traction control, and/or stability control system. Additionally, the detection of a grade may also allow the vehicle to more accurately determine vehicle speed, as a result of the system awareness of the presence and magnitude of the grade.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

While the forms of the invention herein disclosed constitute presently preferred embodiments, many others are possible. Accordingly, it is to be understood that the above description is intended to be illustrative and not restrictive. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A vehicle driveline system, comprising:
a drive unit configured to divide torque between a primary axle and a secondary axle of a vehicle, wherein the drive unit is configured to employ a first torque split for traversing level surfaces below a threshold vehicle speed, wherein a first share of the torque is distributed to the primary axle of the vehicle, and a second share of the torque is distributed to the secondary axle of the vehicle;
wherein the drive unit is configured to detect a first gradient while the vehicle driveline system is traversing the first gradient using a baseline torque split, the first gradient having a positive grade exceeding a grade threshold, the drive unit configured to modify the second share of torque with respect to the first share of torque in response to the detection of the first gradient while traversing the first gradient below the threshold vehicle speed.

2. The vehicle driveline system of claim 1, wherein the drive unit is configured to employ the baseline torque split while traversing a second driving surface having a grade below a predetermined magnitude.

3. The vehicle driveline system of claim 1, wherein the second share of torque is determined from at least a magnitude of the positive grade.

4. The vehicle driveline system of claim 1, further comprising the primary and secondary axles.

5. The vehicle driveline system of claim 4, wherein the primary and secondary axles each are configured to impart rotational motion to at least one wheel.

6. The vehicle driveline system of claim 5, further comprising a driveshaft configured to impart rotational motion from the drive unit to a differential, the differential actuating the secondary axle of the vehicle.

7. The vehicle driveline system of claim 1, wherein the drive unit is a power transfer unit.

8. A vehicle driveline, comprising:
a primary axle configured to impart rotational force to a first set of vehicle wheels;
a secondary axle configured to impart rotational force to a second set of vehicle wheels, wherein the primary and secondary axles are configured to distribute torque using a first torque split for traversing level surfaces below a threshold vehicle speed, wherein a first share of the torque is distributed to the primary axle and a second share of the torque is distributed to the secondary axle; and
a controller configured to detect a first gradient while the vehicle driveline is traversing the first gradient using a baseline torque split, the first gradient having a positive grade exceeding a grade threshold, the controller configured to modify the second share of torque with respect to the first share of torque in response to the detection of the first gradient while traversing the first gradient below the threshold vehicle speed.

9. The vehicle driveline of claim 8, wherein the controller is configured to employ the baseline torque split while traversing a second driving surface having a lower coefficient of friction than the first driving surface, and the second driving surface having a grade below a predetermined magnitude.

10. A method of managing torque imparted to a vehicle driveline, comprising:
determining a baseline torque split for traversing level surfaces below a threshold vehicle speed, wherein a first share of torque is distributed to a primary axle of the vehicle driveline, and a second share of torque is distributed to a secondary axle of the vehicle driveline;
detecting a first gradient of a first driving surface while the vehicle driveline is traversing the first gradient using the baseline torque split, the first gradient having a positive grade exceeding a grade threshold; and
modifying the second share of torque with respect to the first share of torque in response to the detection of the first gradient while traversing the first gradient below the threshold vehicle speed.

11. The method of claim 10, further comprising employing the baseline torque split while traversing a second driving surface having a lower coefficient of friction than the first driving surface, and the second driving surface having a grade less than the grade threshold.

12. The method of claim 10, wherein modifying the second share of torque with respect to the first share includes increasing the second share of torque with respect to the first share of torque.

13. The method of claim 10, wherein modifying the second share of torque with respect to the first share of torque includes decreasing the second share of torque with respect to the first share of torque.

14. The method of claim 10, wherein modifying the second share of torque with respect to the first share of torque includes reducing a bias in favor of the primary axle of the vehicle driveline.

15. The method of claim 10, wherein modifying the second share of torque with respect to the first share of torque includes selectively reducing a control of one of driveline noise and driveline oscillation.

16. The method of claim 10, further comprising detecting a slippage of a wheel supported by the secondary axle.

17. The method of claim 10, further comprising determining the first gradient from a longitudinal component and a lateral component with respect to the vehicle driveline.

18. The method of claim 10, further comprising using the baseline torque split in response to a detection of a lateral gradient exceeding a threshold lateral grade magnitude.

19. The method of claim 10, further comprising enabling detection of the first gradient in response to a satisfaction of a plurality of entry conditions.

20. The method of claim 19, wherein each of the plurality of entry conditions provides an indication that the first gradient can be determined accurately when the entry condition is satisfied.

21. The method of claim 19, further comprising disabling detection of the first gradient when at least one of the plurality of entry conditions is not satisfied.

\* \* \* \* \*